(12) United States Patent
Haber et al.

(10) Patent No.: US 6,185,536 B1
(45) Date of Patent: *Feb. 6, 2001

(54) SYSTEM AND METHOD FOR ESTABLISHING A COMMUNICATION LINK USING USER-SPECIFIC VOICE DATA PARAMETERS AS A USER DISCRIMINATOR

(75) Inventors: William J. Haber, Tempe; Thomas Kroncke, Gilbert; William G. Schmidt, Sun Lakes, all of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/034,277

(22) Filed: Mar. 4, 1998

(51) Int. Cl.[7] .................................................. G10L 17/00
(52) U.S. Cl. ........................ 704/273; 704/246; 455/411; 455/558
(58) Field of Search ................................... 704/270, 273, 704/246, 239, 251; 455/410, 411, 558, 404, 563, 521

(56) References Cited

U.S. PATENT DOCUMENTS

| | | | |
|---|---|---|---|
| 3,752,904 | * | 8/1973 | Waterbury .............................. 248/13 |
| 3,896,266 | * | 7/1975 | Waterbury ............................ 235/380 |
| 4,837,830 | * | 6/1989 | Wrench, Jr. et al. ................ 704/238 |
| 5,127,043 | * | 6/1992 | Hunt et al. ........................ 379/88.02 |
| 5,430,827 | * | 7/1995 | Rissanen .............................. 704/272 |
| 5,497,411 | * | 3/1996 | Pellerin .................................. 379/59 |
| 5,623,539 | * | 4/1997 | Bassenyemukasa et al. ......... 379/88 |
| 5,719,921 | * | 2/1998 | Vysotsky et al. ....................... 379/88 |
| 5,758,317 | * | 5/1998 | Peterson et al. ..................... 704/247 |
| 5,802,251 | * | 9/1998 | Cohen et al. ........................ 704/275 |
| 5,897,616 | * | 4/1999 | Kanevsky et al. ................... 704/246 |
| 5,978,450 | * | 11/1999 | McAllister et al. ................ 379/88.2 |
| 6,038,440 | * | 3/2000 | Wu ....................................... 455/410 |
| 6,078,807 | * | 6/2000 | Dunn et al. .......................... 455/410 |

FOREIGN PATENT DOCUMENTS

| | | | | |
|---|---|---|---|---|
| 28 44 156 | * | 4/1980 | (DE) ................................ G10L/1/04 |
| WO 95/05656 | * | 2/1995 | (WO) ............................... G10L/5/00 |

* cited by examiner

Primary Examiner—David R. Hudspeth
Assistant Examiner—Abul K. Azad
(74) Attorney, Agent, or Firm—Walter W. Nielsen; Jeff D. Limon; Frank J. Bogacz

(57) ABSTRACT

A system and method for establishing a communication link, wherein the system includes a communications unit (60, FIG. 3) having a vocoder (62) for providing user-specific voice data in the form of a unique set of speech characteristic model parameters for each authorized user. The method (200, FIG. 8) includes the steps of providing user-specific voice data via a connection training method (FIGS. 5, 6, or 7), collecting a sample of speech characteristics from a user desiring to access the communication unit (206, FIG. 8), comparing the sample with the user-specific voice data (212), granting the user access to the communication unit to establish a communication link with another communication unit if the sample is comparable with the user-specific voice data (215), and denying the user access to the communication unit if the sample is incomparable with the user-specific voice data (220).

6 Claims, 9 Drawing Sheets

SYSTEM AND METHOD FOR ESTABLISHING A COMMUNICATION LINK USING USER-SPECIFIC VOICE DATA PARAMETERS AS A USER DISCRIMINATOR

RELATED INVENTION

The present invention is related to the following invention which is assigned to the same assignee as the present invention:

(1) User-Customized, Low Bit-Rate Speech Vocoding Method and Apparatus, by Haber et al., Ser. No. 08/537,583, filed Oct. 2, 1995.

FIELD OF THE INVENTION

This invention relates generally to the field of communication systems and, more particularly, to a system and method for establishing a communication link using user-specific voice data parameters as a user discriminator.

BACKGROUND OF THE INVENTION

Unauthorized use of telecommunications subscriber units costs the telecommunications industry very significant annual revenue losses. As a consequence, this industry is continually attempting to come up with more effective subscriber authentication measures.

It is known in the telecommunications art to require the subscriber to enter a Personal Identification Number (PIN) for every subscriber unit call. However, this type of authentication system is susceptible to eavesdropping by unauthorized users who can capture the PIN and use it to make unauthorized calls. Moreover, requiring the subscriber to use a PIN imposes a burden on the subscriber, who already can have an excess of passwords and PINs to keep track of for access to various equipment and systems.

Another known approach to the problem of unauthorized calls is to require the subscriber to use a Subscriber Information Module (SIM) card containing the PIN. However, SIM cards can be lost, stolen, forgotten, or misplaced.

Thus, what is needed are an improved user-authentication system and method for granting subscriber unit access only to authorized subscribers of a communication system.

Also needed is an improved communication system which does not require the subscriber to use a SIM card or enter a PIN number before using the subscriber unit.

Further needed is an improved communication system which allows multiple subscribers to have access to a single subscriber unit without using SIM cards or entering PIN numbers.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
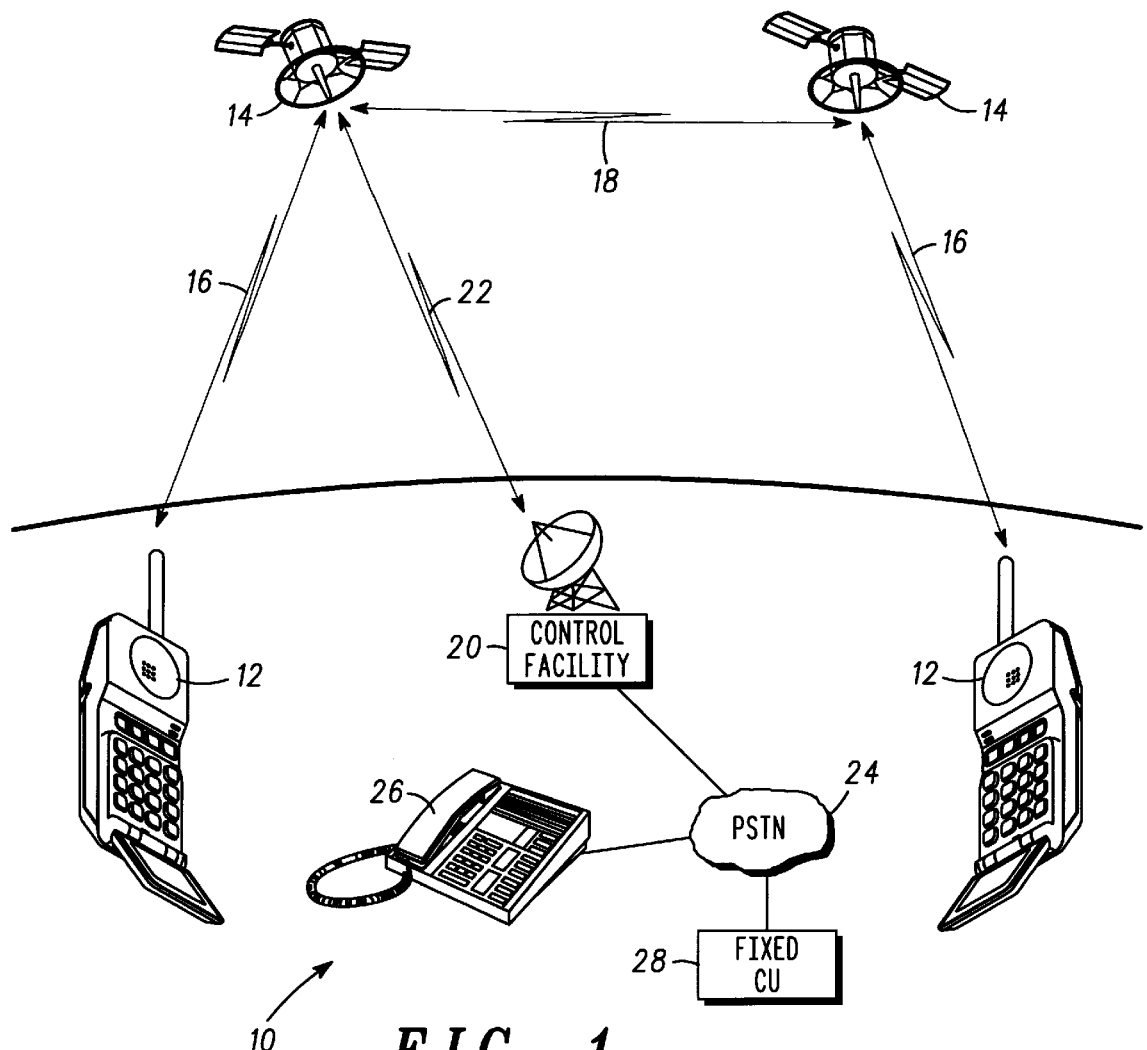
FIG. 1 illustrates a communication system in accordance with a preferred embodiment of the invention.

The present invention provides, among other things, a system and method for establishing a communication link using user-specific voice data parameters as a user discriminator. In a further and more specific aspect, the invention employs user-specific voice data parameters for inhibiting unauthorized use of a communication unit in a communication system.

A preferred embodiment of the invention utilizes a stored speech characteristic model (SCM) vocoder to generate a subscriber's unique speech parameters. As will be explained in greater detail below, this vocoder uses a pre-stored speech characteristic model (SCM) table and input stimulus table containing entries from a registered subscriber. As used herein, the term "registered user" means a user or subscriber who has an SCM table or database and an input stimulus table pre-stored in the communication system. The term is not meant to refer to user registration for the purposes of billing.

The SCM table and input stimulus table can be stored within a communication unit (CU) or an external storage device (e.g., a User Information Card (UIC) or a control facility memory device). As used herein, a "transmit vocoder" is a vocoder that encodes speech samples, and a "receive vocoder" is a vocoder that decodes the speech. The transmit vocoder or the receive vocoder can be located within a CU or in a control facility that provides service to telephones which do not have vocoder equipment.

Details of the SCM vocoder are explained in the above-identified Related Invention. During call setup, the SCM table and input stimulus table for the transmit vocoder user are sent to the receive vocoder to be used in the decoding process. During the call, the speech from the transmit vocoder user is characterized by determining table entries which most closely match the subscriber's speech. Information describing these table entries is sent to the receive vocoder. Although the method and apparatus of the invention are described using SCM tables and input stimulus tables, other user-customized tables used to characterize speech are encompassed within the scope of the description and claims.

The system and method of providing user-specific access to a communication system using user-specific voice data or SCMs as a user discriminator to facilitate user-specific authorized access to a communication system is set forth in the figures and the accompanying description. In general, the method involves providing user-specific voice data, preferably in the form of a user-specific SCM database, a subscriber subsequently generating a voice sound to access a CU, granting the subscriber access to the CU to establish a communication link if the subsequently generated voice sound matches, correlates or is otherwise comparable with user-specific voice data, and denying the subscriber access to the CU if the subsequently generated voice sound is incomparable with the user-specific voice data.

The purpose of the invention is to inhibit unauthorized use of a CU. The determination of whether a subscriber is an authorized user, carried out through a process called "authorization training", is made by virtue of algorithms which operate to compare an SCM of the subscriber's voice with a database of user-specific SCM parameters developed by the subscriber through a process called "connection training". If the SCM developed from the initial stages of a typical call establishment is not comparable with an inventory of stored user-specific SCM parameters, the call is considered "unauthorized", and the connection request is denied. An exception to this is a request for certain emergency calls such as a request for a 911 connection.

This authorization approach, when used for every call, does not require the subscriber to always enter a personal-identification-number (PIN), thereby making it less susceptible to eavesdropping methods that focus on capturing the PIN and using it to make unauthorized calls.

The authorization training is enabled by the use of a Subscriber Identification (SID) which can be furnished to a subscriber by a service provider and kept private by the subscriber. The SID is normally on a UIC supplied by the service provider and is used only to initiate connection training.

FIG. 1 illustrates a communication system 10 in accordance with a preferred embodiment of the invention. Communication system 10 includes Mobile Communication Units 12 (MCUs), satellites 14, Control Facility 20 (CF), Public Switched Telephone Network 24 (PSTN), conventional telephone 26, and Fixed CU 28 (FCU). As used herein, where both MCUs 12 and FCUs 28 perform the same functions, the general term Communication Unit (CU) will be used.

MCUs 12 can be, for example, cellular telephones or radios adapted to communicate with satellites 14 over radio-frequency (RF) communication links 16. FCUs 28 can be telephone units linked directly with PSTN 24 which have attached or portable handsets. Unlike conventional telephone 26, CUs 12 and 28 include vocoder devices for compressing speech data. In a preferred embodiment, CUs 12 and 28 also include a User Information Card (UIC) interface. This interface allows a CU subscriber to swipe or insert a UIC containing information unique to the subscriber. A UIC can be, for example, a magnetic strip card. The UIC contains one or more user identification numbers, SCM tables, and input stimulus tables which are loaded into the vocoding process. By using a UIC, a user can load his or her user-unique vocoding information, in the form of encoding information tables, into any CU. CUs 12 and 28 are described in more detail in conjunction with FIG. 3.

Satellites 14 can be low-earth, medium-earth, or geostationary satellites. In a preferred embodiment, satellites 14 are low-earth orbit satellites which communicate with each other over inter-satellite link 18. Thus, a call from a first CU 12, 28 that is serviced by a first satellite 14 can be routed directly through one or more satellites over links 18 to a second CU 12, 28 serviced by a second satellite 14. In an alternative embodiment, satellites 14 can be part of a "bent pipe" system, i.e. a system in which satellites do not communicate with one another but rather function as transponders with respect to terrestrial-based transceivers. Satellites 14 route data packets received from CUs 12, CF 20, and other communication devices (not shown). Satellites 14 communicate with CF 20 over link 22.

CF 20 is a device which provides an interface between satellites 14 and a terrestrial telephony apparatus, such as PSTN 24, which provides telephone service to conventional telephone 26 and FCU 28. In a preferred embodiment, CF 20 includes a vocoder which enables CF 20 to decode encoded speech signals before sending the speech signals through PSTN 24 to conventional telephone 26. Because FCU 28 includes its own vocoder, the vocoder located within CF 20 does not need to decode the encoded speech signals destined for FCU 28. CF 20 is described in more detail in conjunction with FIG. 4.

As described above, in a preferred embodiment a user's SCM table and input stimulus table are stored on a UIC. In an alternative embodiment, the SCM table and input stimulus table are stored in a CU memory device. In another alternative embodiment, CF 20 includes a memory device in which SCM tables and input stimulus tables are stored for registered subscribers. During call setup, a CF that has the registered subscriber's tables in storage sends the SCM table and input stimulus table to both the transmit vocoder and the receive vocoder.

FIG. 1 illustrates only a few of CUs 12 and 28, satellites 14, CF 20, PSTN 24, and telephone 26 for ease of illustration. However, any number of CUs 12 and 28, satellites 14, CFs 20, PSTNs 24, and telephones 26 can be used in a communication system which implements the present invention.

Figure 2:
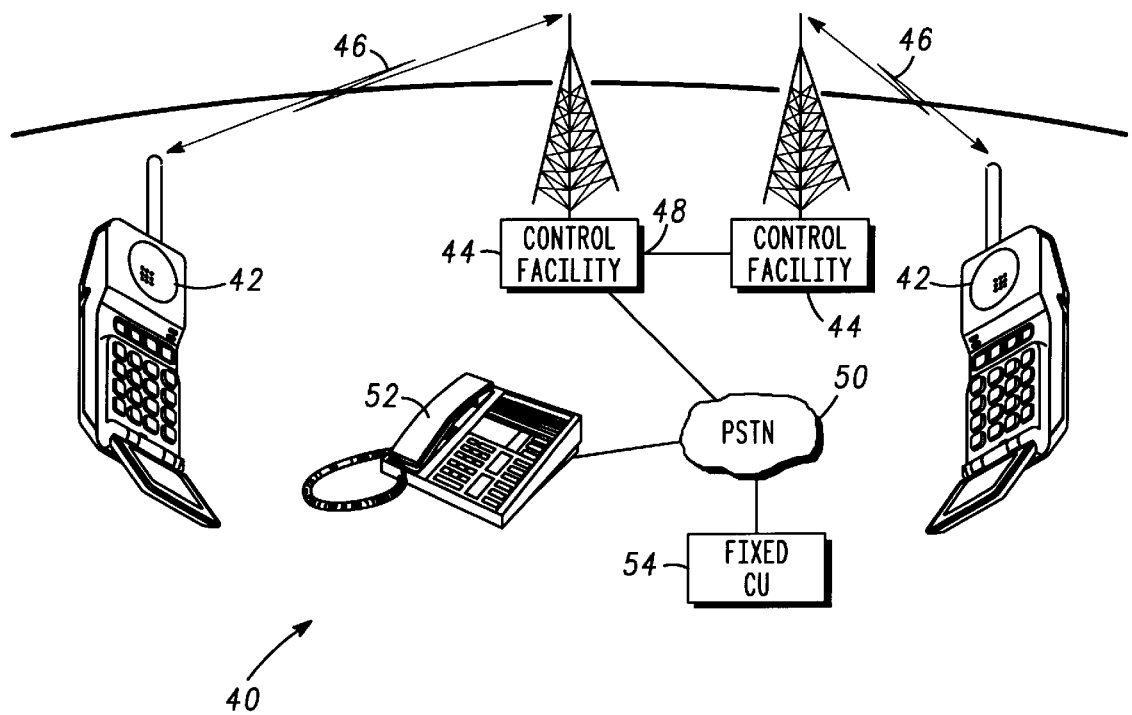
FIG. 2 illustrates a communication system in accordance with an alternative embodiment of the invention.

FIG. 2 illustrates a communication system 40 in accordance with an alternative embodiment of the invention. Communication system 40 includes MCUs 42, CFs 44, PSTN 50, conventional telephone 52, and FCU 54. MCUs 42 can be, for example, cellular telephones or radios adapted to communicate with CFs 44 over RF links 46. CUs 42 and 54 include a vocoder device for compressing speech data. In a preferred embodiment, CUs 42 and 54 also include a UIC interface. CUs 42 and 54 are described in more detail in conjunction with FIG. 3.

CF 44 is a device which provides an interface between MCUs 42 and a terrestrial telephony apparatus, such as PSTN 50 which provides telephone service to conventional telephone 52 and FCU 54. In addition, CF 44 can perform call setup functions and other system control functions. In a preferred embodiment, CF 44 includes a vocoder which enables CF 44 to decode encoded speech signals before sending the speech signals through PSTN 50 to conventional telephone 52. Because FCU 54 includes its own vocoder, the vocoder located within CF 44 does not need to decode the encoded speech signals destined for FCU 54.

Multiple CFs 44 can be linked together using link 48 which can be a radio-frequency (RF) or hard-wired link. Link 48 enables CUs 42 and 54 in different areas to communicate with each other. CF 44 is described in more detail in conjunction with FIG. 4.

FIG. 2 illustrates only a few of CUs 42 and 54, CFs 44, PSTN 50, and telephone 52 for ease of illustration. However, any number of CUs 42 and 54, CFs 44, PSTNs 50, and telephones 52 can be used in a communication system which implements the present invention.

In an alternative embodiment, the systems of FIG. 1 and FIG. 2 can be networked together to allow communication between terrestrial and satellite-based RF communication systems.

Figure 3:
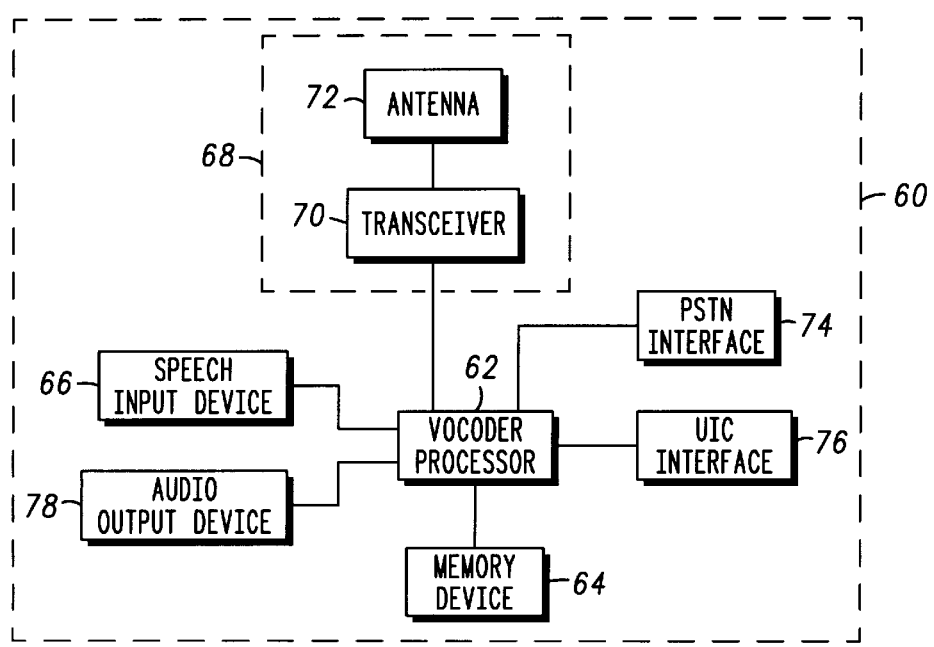
FIG. 3 illustrates a communication unit in accordance with a preferred embodiment of the invention.

FIG. 3 illustrates a CU 60 in accordance with a preferred embodiment of the invention. CU 60 can be either an MCU (e.g., MCU 12, FIG. 1) or an FCU (e.g., FCU 28, FIG. 1). CU 60 includes vocoder processor 62, memory device 64, speech input device 66, and audio output device 74. Memory device 64 is used to store SCM tables and input stimulus tables for use by vocoder processor 62. Speech input device 66 is used to collect speech samples from the subscriber of CU 60. Speech samples are encoded by vocoder processor 62 during a call, and they also are used to generate the SCM tables and input stimulus tables during a training procedure. Audio output device 74 is used to output decoded speech.

It may be helpful to the reader at this point for vocoder processor 62 to be described in more detail. "Voice coders", referred to commonly as "vocoders", compress and decompress speech data. Advanced, low-rate vocoders allow a digital communication system to increase the number of system communication channels by decreasing the bandwidth allocated to each channel, because they reduce the number of bits required for transmission of intelligible digitized speech. Fundamentally, a vocoder implements specialized signal processing techniques to analyze or compress speech data at an analysis device and synthesize or decompress the speech data at a synthesis device.

Speech data compression typically involves parametric analysis techniques, whereby the fundamental or "basis" elements of the speech signal are extracted. These extracted basis elements are encoded and sent to the synthesis device in order to provide for reduction in the amount of transmitted or stored data. At the synthesis device, the basis elements can be used to reconstruct an approximation of the original speech signal.

With CELP-type ("Code Excited Linear Prediction") vocoders, the encoder estimates a speaker's speech characteristics, and it calculates the approximate pitch. The vocoder also characterizes the "residual" underlying the speech by comparing the residual in the speech frame with a table containing pre-stored residual samples. An index to the closest-fitting residual sample, coefficients describing the speech characteristics, and the pitch are packed into a bitstream and sent to the decoder. The decoder extracts the index, coefficients, and pitch from the bitstream and simulates the frame of speech.

In a preferred embodiment, CU 60 also includes User Information Card (UIC) interface 76. As described previously, a subscriber can insert or swipe a UIC through UIC interface 76, enabling the subscriber's unique SCM table and input stimulus table to be loaded into memory device 64. In alternative embodiments, the subscriber's unique SCM table and input stimulus table are pre-stored in memory device 64 or in a CF (e.g., CF 20, FIG. 1).

When CU 60 is an FCU, CU 60 includes PSTN interface 78, which enables CU 60 to communicate with a PSTN (e.g., PSTN 24, FIG. 1). When CU 60 is an MCU, CU 60 includes RF interface unit 68. RF interface unit 68 includes transceiver 70 and antenna 72, which enable CU 60 to communicate over an RF link (e.g., to satellite 14, FIG. 1). When a CU is capable of functioning as both an FCU and an MCU, the CU includes both PSTN interface 78 and RF interface 68.

Figure 4:
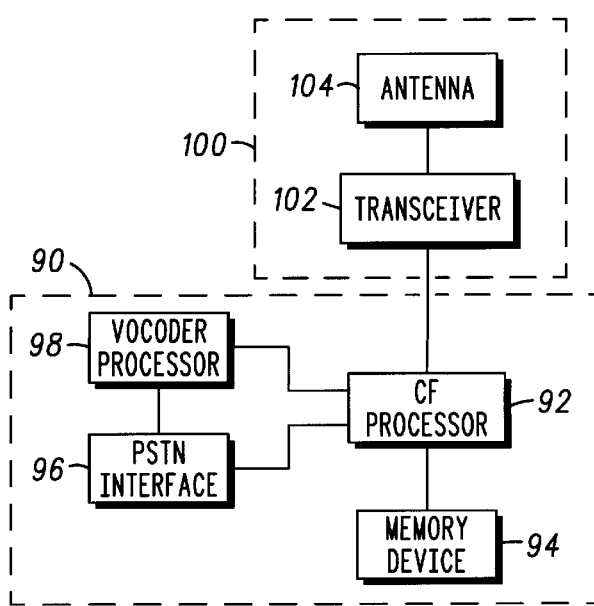
FIG. 4 illustrates a control facility in accordance with a preferred embodiment of the invention.

FIG. 4 illustrates CF 90 (e.g., CF 20 FIG. 1) in accordance with a preferred embodiment of the invention. CF 90 includes CF processor 92, memory device 94, PSTN interface 96, and vocoder processor 98. CF processor 92 performs the functions of call setup and telemetry, tracking, and control. Memory device 94 is used to store information needed by CF processor 92. In an alternative embodiment, memory device 94 contains SCM tables and input stimulus tables for registered subscribers. When a call with a registered subscriber is being set up, CF processor 92 sends the SCM tables and the input stimulus tables to the transmit CU and receive CU.

Vocoder processor 98 is used to encode and decode speech when a conventional telephone (e.g., telephone 26, FIG. 1) is a party to a call with a CU. When a call between a CU and an FCU (e.g., FCU 28, FIG. 1) is being supported, vocoder processor 98 can be bypassed as shown in FIG. 4. PSTN interface 96 allows CF processor 92 and vocoder processor 98 to communicate with a PSTN (e.g., PSTN 24, FIG. 1).

CF 90 is connected to RF interface 100 by a hard-wired, RF, or optical link. RF interface 100 includes transceiver 102 and antenna 104 which enable CF 20 to communicate with satellites (e.g., satellites 14, FIG. 1) or MCUs (e.g., MCUs 42, FIG. 2). RF interface 100 can be co-located with CF 90, or it can be remote from CF 90.

Figure 5:
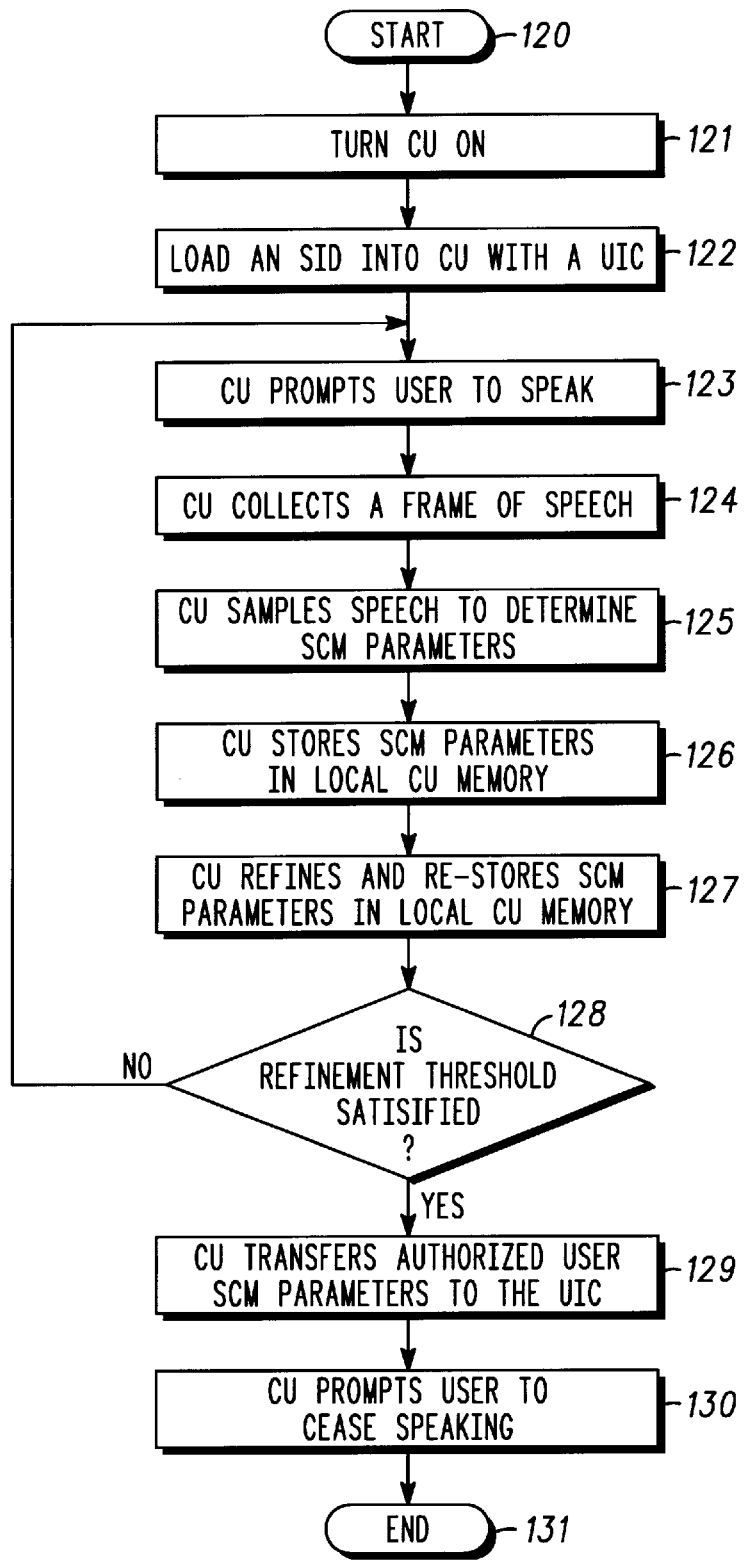
FIG. 5 illustrates a flow chart of a connection training method in accordance with a preferred embodiment of the invention.

FIG. 5 illustrates a flow chart of a connection training method in accordance with a preferred embodiment of the invention. The connection training process starts (120) with a subscriber turning his or her CU on in step 121, followed by the subscriber loading a SID into the CU with a UIC in step 122. The CU prompts the subscriber to speak in step 123. As the subscriber speaks, the CU collects (step 124) the user-specific voice sound, otherwise called a frame of speech, and then samples (step 125) the speech to determine SCM parameters which are stored in local CU memory in step 126 and refined and re-stored in local CU memory in step 127.

A determination of whether a refinement SCM threshold is satisfied occurs in step 128. If the refinement SCM threshold is not satisfied, steps 123–128 are repeated. If the refinement SCM threshold is satisfied, the CU transfers (step 129), authorized user SCM parameters in the form of a database to the UIC, and the CU prompts (step 130) the subscriber to cease speaking to end (131) the connection training method.

Figure 6:
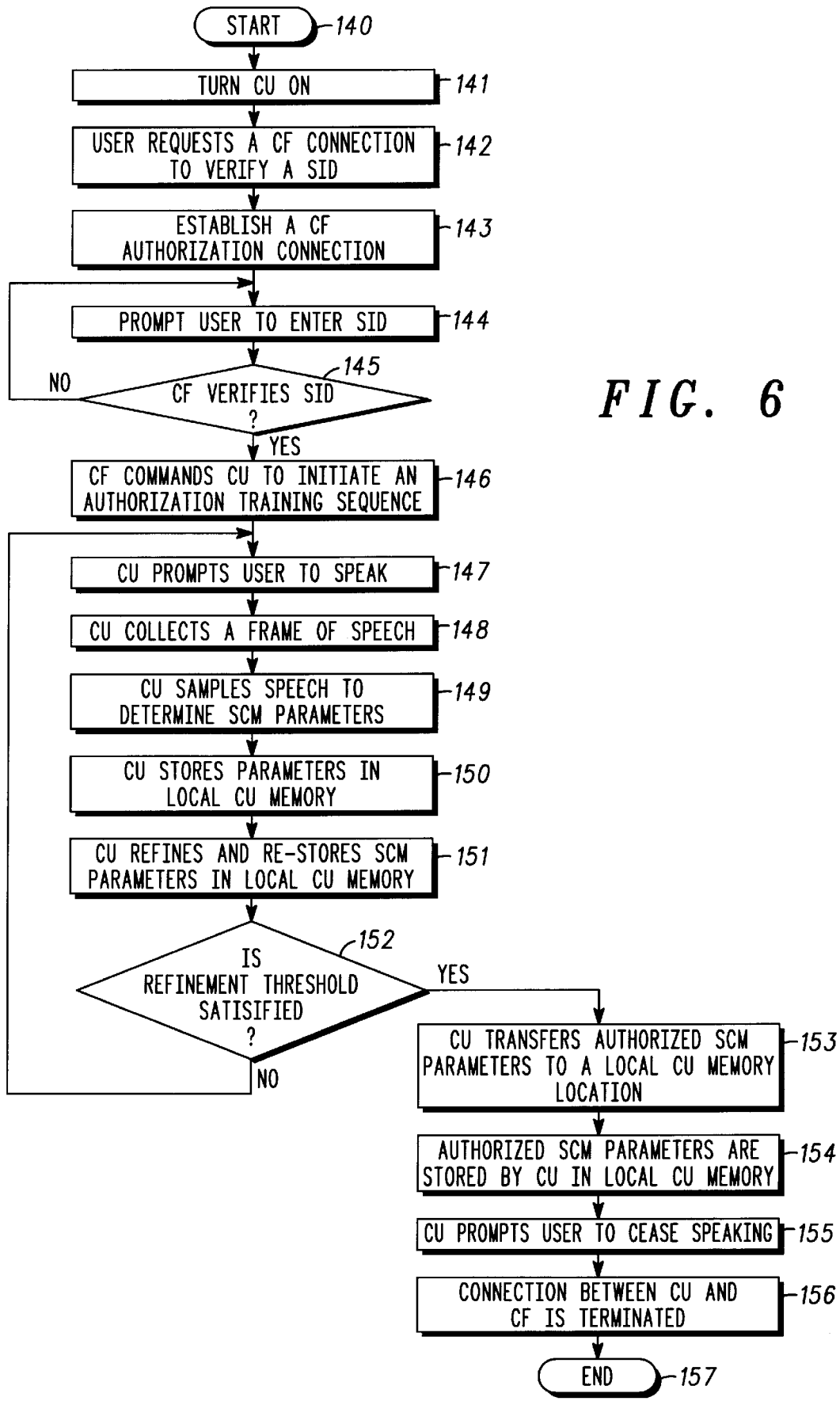
FIG. 6 illustrates a flow chart of a connection training method in accordance with an alternative embodiment of the invention.

FIG. 6 illustrates a flow chart of a connection training method in accordance with an alternative embodiment of the invention. The connection training process in accordance with an alternative embodiment starts (140) with a subscriber turning his or her CU on in step 141. The subscriber then requests (step 142) a CF connection to verify a SID to establish (step 143) a CF authorization connection.

When the CF authorization connection is established, the CU prompts (step 144) the subscriber to enter the subscriber's SID, and the CF conducts a query to verify (step 145) the SID. If the CF cannot verify the SID, step 144 and 145 are repeated. If the CF cannot verify the SID a second time, or other predetermined number of times, the call is disconnected. However, if the CF can verify the SID, the CF commands (step 146) the CU to initiate an connection training sequence in which the CU prompts (step 147) the subscriber to speak.

As the user speaks, the CU collects (step 148) the user-specific voice sound, otherwise called a frame of speech, and then samples (step 149) the speech to determine speech characteristic model (SCM) parameters which are stored in local CU memory in step 150 and refined and restored in local CU memory in step 151. A determination of whether a refinement SCM threshold is satisfied takes place in step 152. If the refinement SCM threshold is not satisfied, steps 147–152 are repeated. If the refinement SCM threshold is satisfied, the CU transfers (step 153) authorized SCM parameters in the form of a database to a local CU memory location which is then stored (step 154) in the local CU memory, after which the CU prompts (step 155) the user to cease speaking. The connection between the CU and the CF terminates in step 156 to end (157) the connection training method.

Figure 7:
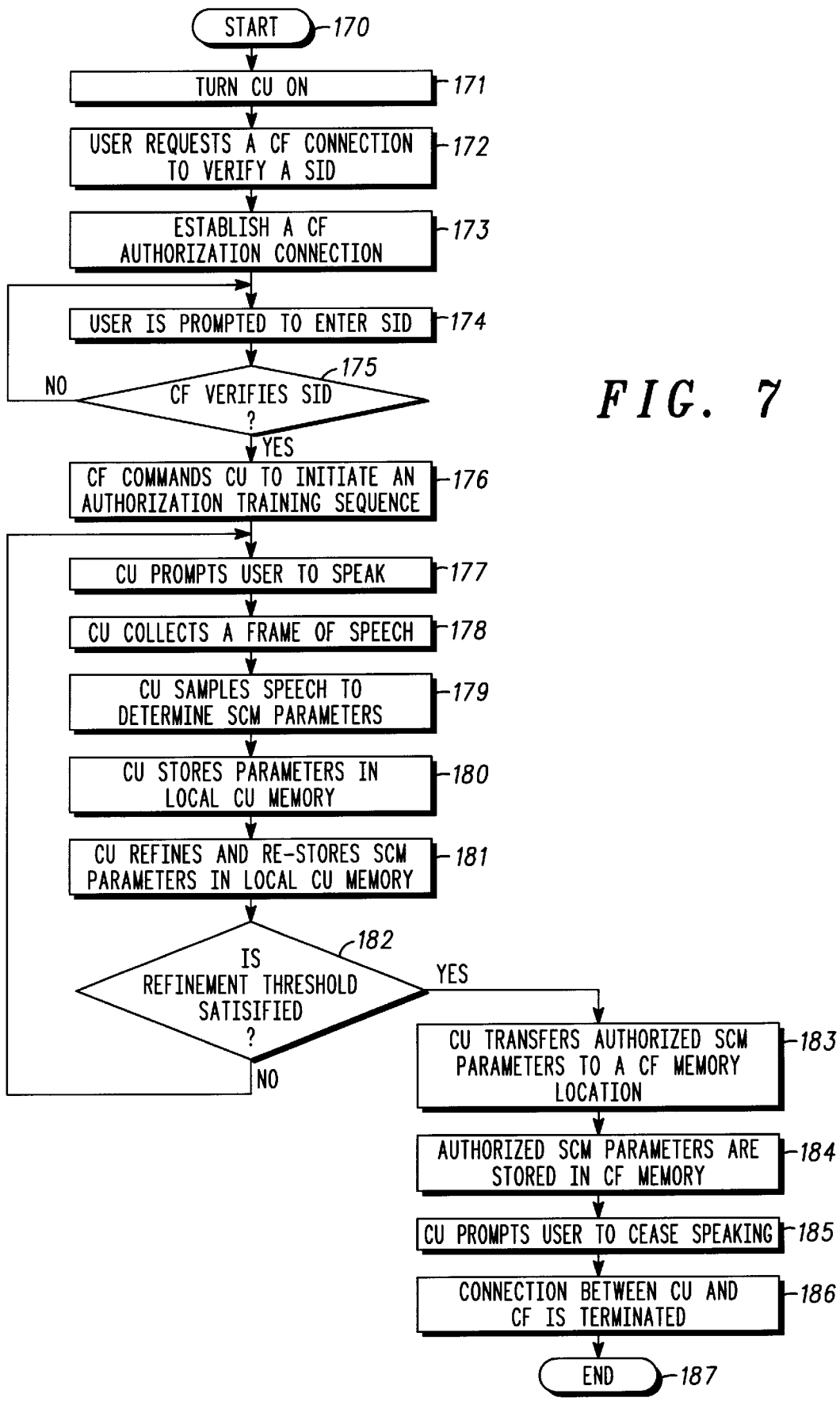
FIG. 7 illustrates a flow chart of a connection training method in accordance with yet another alternative embodiment of the invention.

FIG. 7 illustrates a flow chart of a connection training method in accordance with yet another alternative embodiment of the invention. The connection training process in accordance with yet another alternative embodiment starts (170) with a subscriber turning his or her CU on in step 171. The subscriber then requests (step 172) a CF connection to verify a SID to establish (step 173) a CF authorization connection. When the CF authorization connection is established, the CU prompts (step 174) the subscriber to enter the subscriber's SID, and the CF conducts a query to verify (step 175) the SID.

If the CF cannot verify the SID, steps 174 and 175 are repeated. If the CF cannot verify the SID a second time, or other predetermined number of times, the call is disconnected. However, if the CF can verify the SID, the CF commands (step 176) the CU to initiate an connection training sequence in which the CU prompts (step 177) the subscriber to speak. As the subscriber speaks, the CU collects (step 178) the user-specific voice sound, otherwise called a frame of speech, and then samples (step 179) the speech to determine speech characteristic model (SCM) parameters which are stored in local CU memory in step 180 and refined and re-stored in local CU memory in step 181.

A determination of whether a refinement SCM threshold is satisfied takes place in step 182. If the refinement SCM threshold is not satisfied, steps 177–182 are repeated. If the refinement SCM threshold is satisfied, the CU transfers (step 183) authorized SCM parameters in the form of a database to a CF memory location which is then stored (step 184) in the CF memory location in the form of an authorized user database, after which the CU prompts (step 185) the subscriber to cease speaking. The connection between the CU and the CF terminates in step 186 to end (187) the connection training method.

Figure 8:
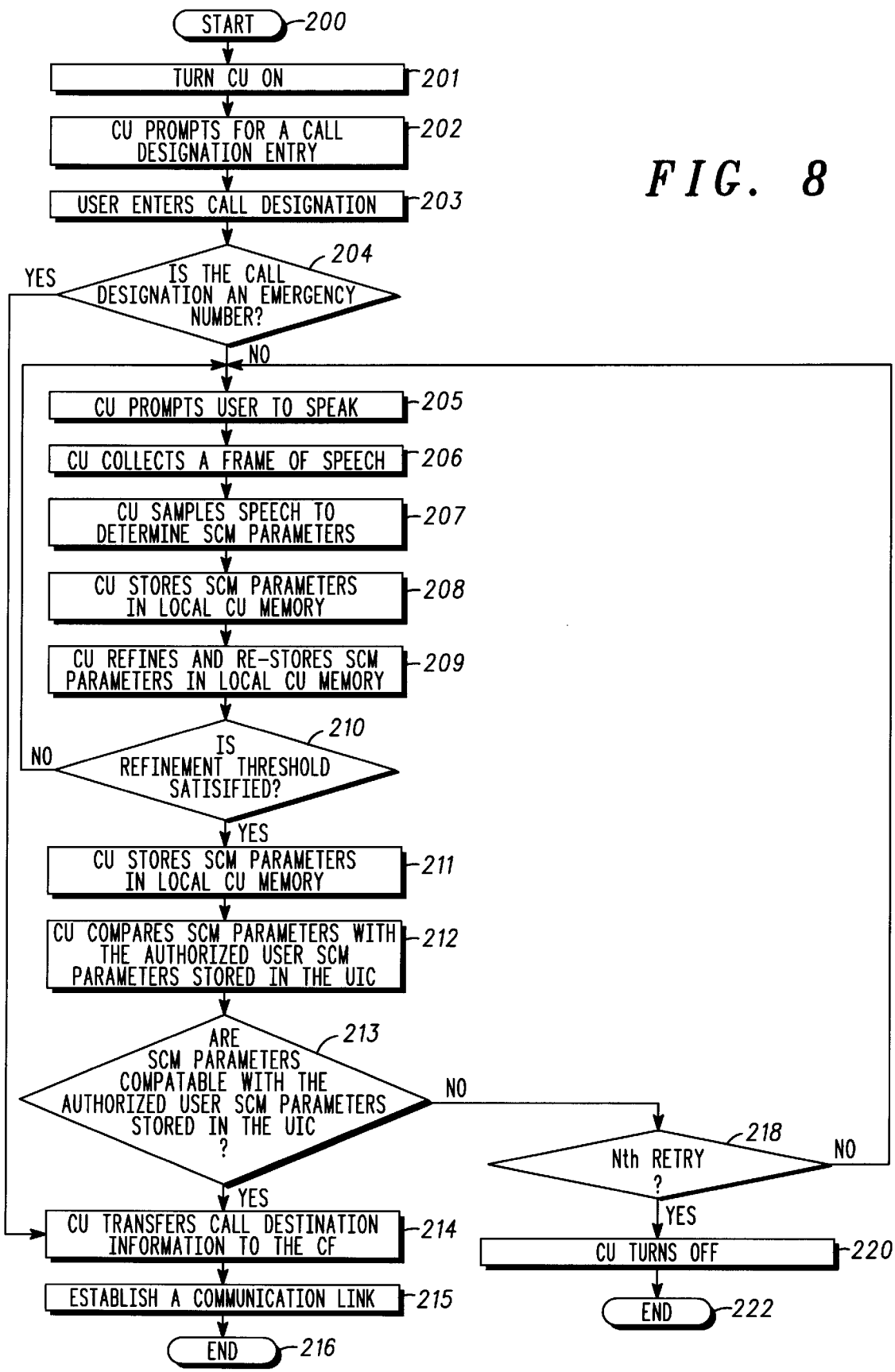
FIG. 8 illustrates a flow chart of a method of establishing a communication link in accordance with a preferred embodiment of the invention.

FIG. 8 illustrates a flow chart of a method of establishing a communication link in accordance with a preferred embodiment of the invention. The process for establishing a communication link is operative as an authorization training sequence that starts (200) with a user turning his or her CU on in step 201 after which the CU prompts (step 202) for a call destination entry.

The user then enters (step 203) a call destination, and a query (step 204) is made to ascertain whether the call destination is an emergency number such as a 911 call destination. If the call destination is not an emergency number, the CU prompts (step 205) the user to speak.

As the subscriber speaks, the CU collects (step 206) a sample of the user-specific voice sound or speech characteristics, otherwise called a frame of speech, and then samples (step 207) the speech to determine speech characteristic model (SCM) parameters which are stored in local CU memory in step 208 and refined and re-stored in local CU memory in step 209. A determination of whether a refinement SCM threshold is satisfied takes place in step 210. If the refinement SCM threshold is not satisfied, steps 205–209 are repeated. If the refinement SCM threshold is satisfied, the CU stores (step 211) the SCM parameters in local CU memory and compares (step 212) the SCM parameters in local CU memory with the authorized user SCM parameters stored in the UIC.

The CU then conducts a query (step 213) to ascertain whether the SCM parameters are comparable with the authorized user SCM parameters stored in the UIC. If the SCM parameters are incomparable with the authorized user SCM parameters, steps 205–213 are repeated either automatically or by the subscriber. If the SCM parameters are still incomparable with the authorized user SCM parameters stored in the UIC, the CU turns off to end the call.

However, if through step 213 a determination is made by the CU that the SCM parameters are comparable with the authorized user parameters, the CU transfers (step 214) call destination information to a CF to establish (step 215) communication link with CF and another communication unit to end (step 216) the authorization process.

If in step 204 a determination is made that the call destination is an emergency number such as 911, steps 214–216 are immediately carried out, bypassing steps 205–213.

Figure 9:
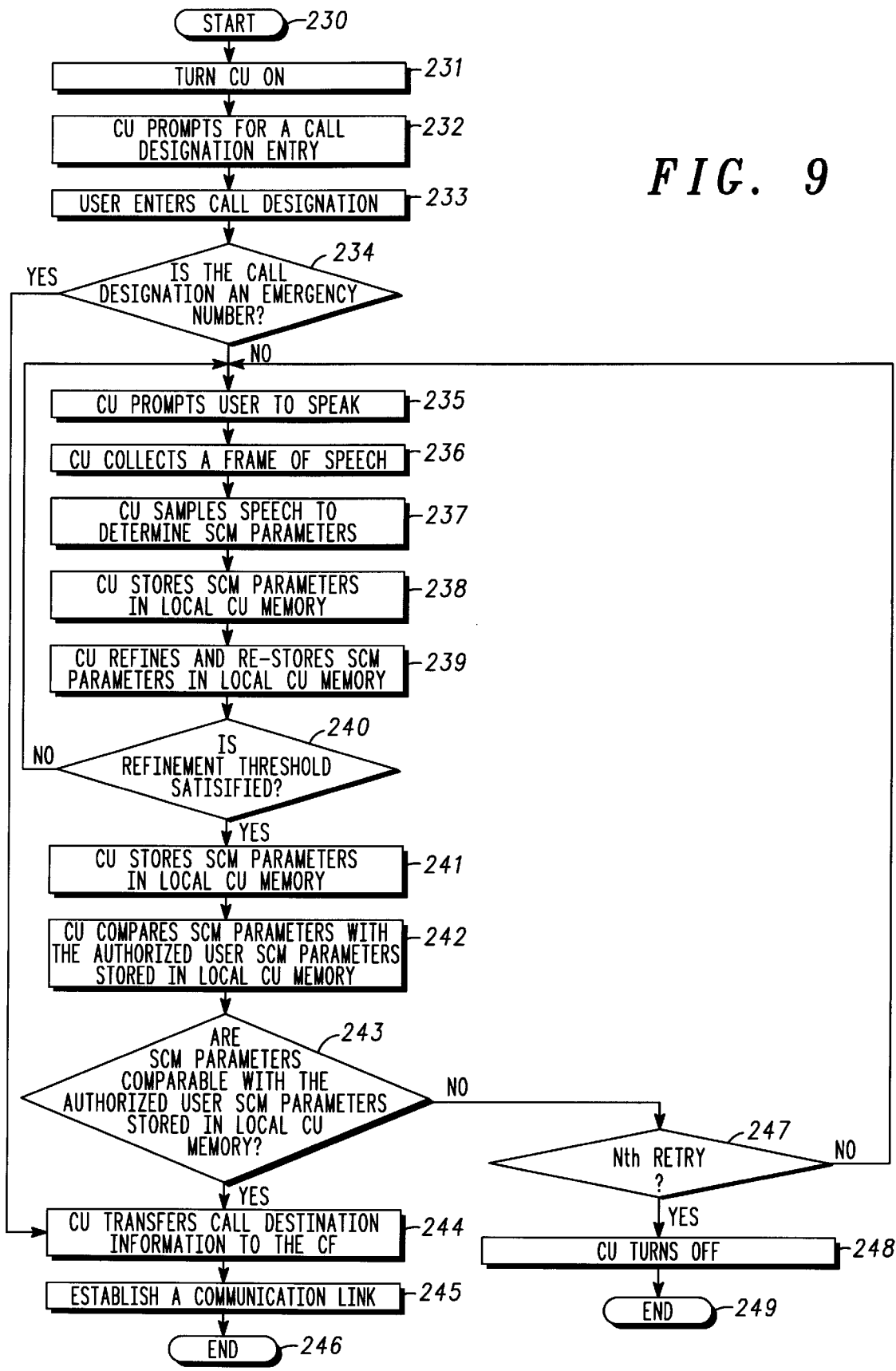
FIG. 9 illustrates a flow chart of a method of establishing a communication link in accordance with an alternative embodiment of the invention.

FIG. 9 illustrates a flow chart of a method of establishing a communication link in accordance with an alternative embodiment of the invention. The process for establishing a communication link is operative as an authorization training sequence that starts (step 230) with a subscriber turning his or her CU on in step 231, after which the CU prompts (step 232) for a call destination entry. The subscriber then enters (step 233) a call destination, and a query (step 234) is made to ascertain whether the call destination is an emergency number such as a 911 call destination. If the call destination is not an emergency number, the CU prompts (step 235) the subscriber to speak.

As the subscriber speaks, the CU collects (step 236) the user-specific voice sound, otherwise called a frame of speech, and then samples (step 237) the speech to determine speech characteristic model (SCM) parameters which are stored in local CU memory in step 238 and refined and restored in local CU memory in step 238.

A determination of whether a refinement SCM threshold is satisfied takes place in step 240. If the refinement SCM threshold is not satisfied, steps 235–240 are repeated. If the refinement SCM threshold is satisfied, the CU stores (step 241) the SCM parameters in local CU memory and compares (step 242) the SCM parameters in local CU memory with the authorized user SCM parameters stored in the local CU memory.

The CU then conducts a query (step 243) to ascertain whether the SCM parameters are comparable with the authorized user SCM parameters stored in the local CU memory. If the SCM parameters are incomparable with the user authorized SCM parameters, steps 235–243 are repeated either automatically or by the subscriber. If the SCM parameters are still incomparable with the authorized user SCM parameters stored in the UIC after N retries (step 247), the CU turns off (step 248) to end the call (step 249). However, if in step 243 a determination is made by the CU that the SCM parameters are comparable with the authorized user parameters, the CU transfers (step 244) call destination information to a CF to establish (step 245) a communication link with the CF and another communication unit to end (step 246) the authorization process.

If in step 234 a determination is made that the call destination is an emergency number such as 911, steps 244–246 are immediately carried out, bypassing steps 235–243.

Figure 10A:
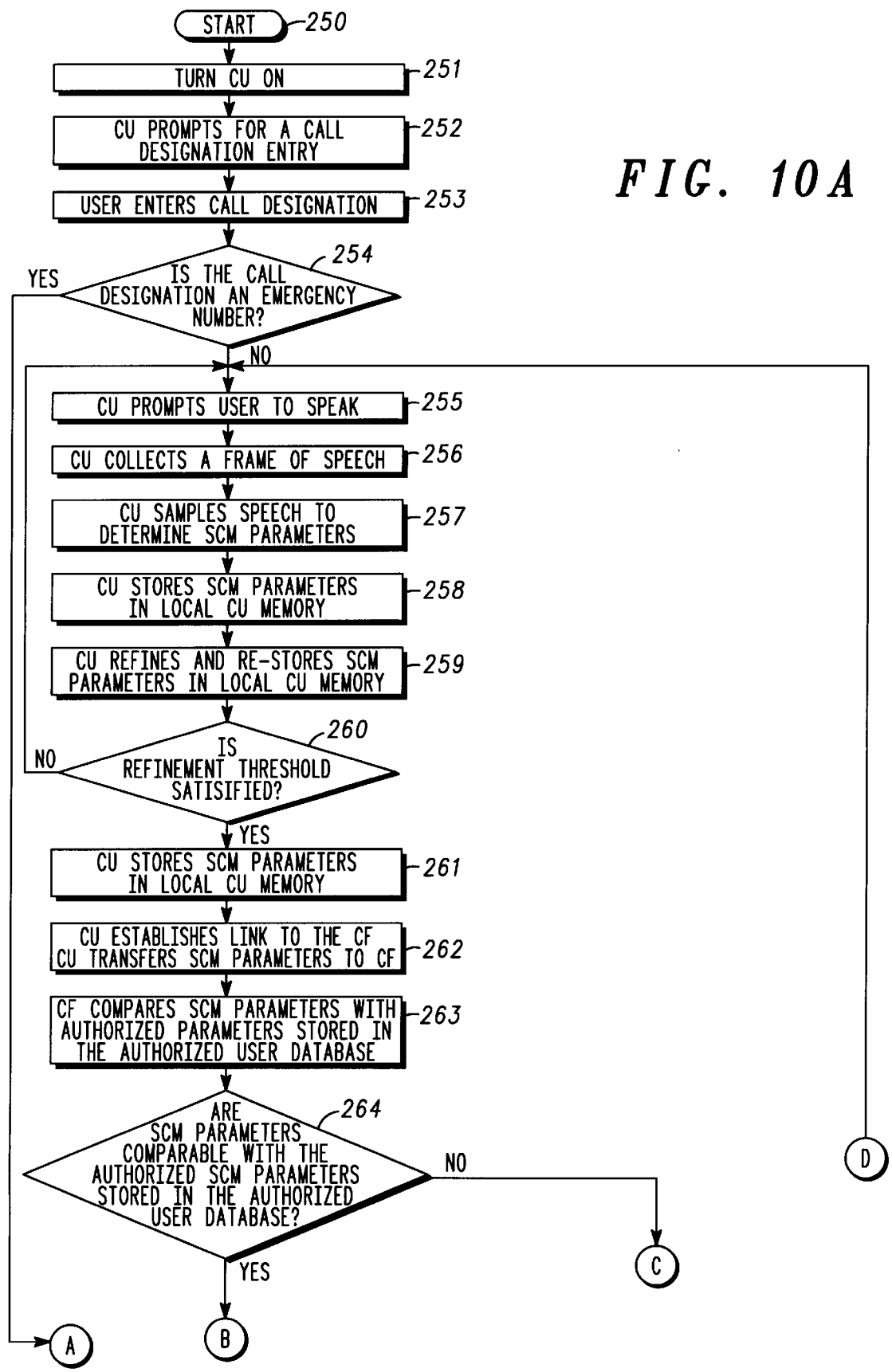
FIG. 10 illustrates a flow chart of a method of establishing a communication link in accordance with yet another alternative embodiment of the invention.
Figure 10B:
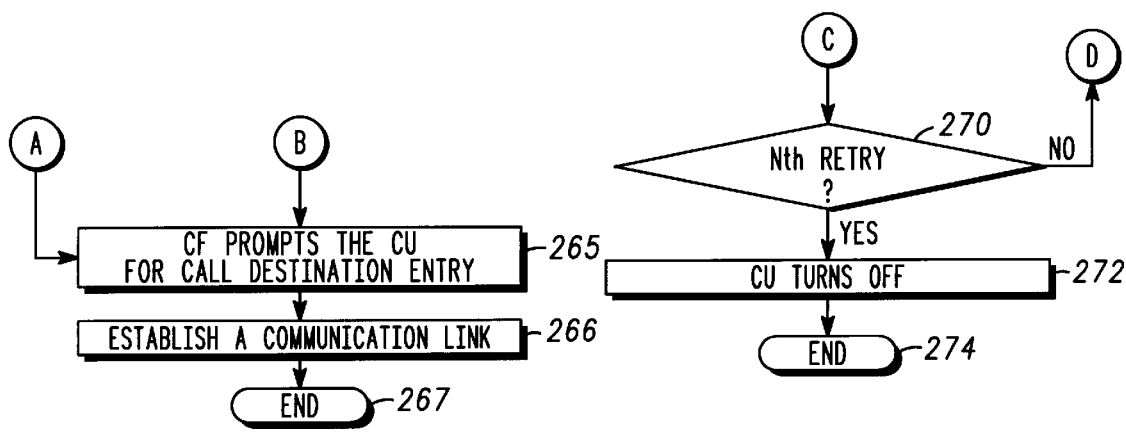

FIG. 10 illustrates a flow chart of a method of establishing a communication link in accordance with yet another alternative embodiment of the invention. The process for establishing a communication link is operative as an authorization training sequence that starts (step 250) with a subscriber turning his or her CU on in step 251, after which the CU prompts (step 252) for a call destination entry. The subscriber then enters (step 253) a call destination, and a query (step 254) is made to ascertain whether the call destination is an emergency number such as a 911 call destination. If the call destination is not an emergency number, the CU prompts (step 255) the subscriber to speak.

As the subscriber speaks, the CU collects (step 256) the user-specific voice sound, otherwise called a frame of speech, and then samples (step 257) the speech to determine speech characteristic model (SCM) parameters which are stored in local CU memory in step 258 and refined and restored in local CU memory in step 259.

A determination of whether a refinement SCM threshold is satisfied takes place in step 260. If the refinement SCM threshold is not satisfied, steps 255–260 are repeated. If the refinement SCM threshold is satisfied, the CU stores (step 261) the SCM parameters in local CU memory. Then the CF establishes a link to the CF and transfers the SCM parameters to the CF (step 262). The CF then compares (step 263) the SCM parameters with the authorized user SCM parameters in the authorized user database stored in the CF.

The CF then conducts a query (step 264) to ascertain whether the SCM parameters are comparable with the authorized SCM parameters stored in the authorized user database. If the SCM parameters are incomparable with the authorized SCM parameters stored in the authorized user database, steps 255–264 are repeated. If the SCM parameters are still incomparable with the authorized user SCM parameters stored in the UIC after N retries (step 270), the CU turns off (step 272) to end the call (step 274).

However, if in step 264 a determination is made by the CF that the SCM parameters are comparable with the authorized user SCM parameters stored in the authorized user database, the CF prompts (step 265) the CU for a call destination to establish (step 266) a communication link with another communication unit to end (step 267) the authorization process.

If in step 254 a determination is made that the call destination is an emergency number such as 911, steps 265–267 are immediately carried out, bypassing steps 255–264.

In summary, the invention provides a system and method which inhibits unauthorized access to a communication system by using user-specific voice data parameters as a user discriminator. The method and system is very secure and precludes the need for PINs or any per-call manual "passwording". Furthermore, should a subscriber wish to extend the authorized use of his or her communication unit to other subscribers, the SID can be used to initiate an authorization sequence for one or more additional subscribers. In this regard, the UIC, CIJ or CF would then maintain a complete set of a plurality of authorized SCMs for that SID, any one of which, when correlating with the SCM developed from the authorization training, discussed in combination with FIGS. 8–10, enables the call establishment sequence to continue.

Additionally, should an unauthorized person attempt to use another subscriber's CU, the normal SCM connection training generates the subscriber's SCM which, when compared with the SCM database of authorized callers stored in the UIC, CU or CF, fails to correlate, and the call establishment procedure terminates.

Consistent with the teachings of the invention, after a communication link has been established during an authorization training sequence at steps 215, 245 and 266 in FIGS. 8–10, respectively, the CU and/or the CF can be employed for monitoring, either periodically or continually, the subscriber's voice and comparing the subscriber's voice with stored authorized SCM parameters during the call to verify that an authorized user is using the CU throughout the duration of the call. If an authorized user were to take the CU from the user and start speaking into the CU, the CU and/or CF would terminate the call.

Furthermore, and over time, the CU and/or the CF can also be employed for either periodically or continually monitoring one or more authorized user's voices to continually update authorized SCM parameters. In this regard, the algorithms governing the operation of the connection training sequences and authorization training sequences can be customized in accordance with specific needs of an authorized user or authorized users.

The invention has been described above with reference to a preferred embodiment. However, those skilled in the art will recognize that changes and modifications can be made in the described embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and precise terms as to enable those skilled in the art to understand and practice the same, the invention claimed is:

1. A cellular telephone, comprising:
 a speech input device for receiving a voice sound from a user desiring to access said cellular telephone and establish a communication link;
 a user information card interface configured to receive a user identification card having a user identification number for enabling user-specific voice data of said user;
 a processor coupled to said speech input device and said user information card interface, said processor configured to compare said voice sound with said user-specific voice data and deny said user access to the cellular telephone such that a communication link may not be established unless said voice sound is comparable with said user-specific voice data or a call destination is an emergency number said processor being located within said cellular telephone.

2. The cellular telephone of claim 1, said cellular telephone further comprising a memory device configured to store said user-specific voice data.

3. The cellular telephone of claim 2, wherein said memory device is configured to store user-specific voice data for a plurality of users.

4. The communication unit of claim 1, and further comprising a user information card interface adapted to receive a user information card containing said user-specific voice data.

5. The communication unit of claim 1, and further comprising a user information card interface coupled to the processor for reading the user identification number from a user information card inserted into the communication unit, for accessing the user-specific voice data stored on the user information card for the user identification number.

6. The cellular telephone of claim 1, wherein said user-specific voice data comprises a set of speech cavity model parameters.

* * * * *

UNITED STATES PATENT AND TRADEMARK OFFICE
CERTIFICATE OF CORRECTION

PATENT NO. : 6,185,536 B1  
DATED : February 6, 2001  
INVENTOR(S) : William J. Haber et al.

It is certified that error appears in the above-identified patent and that said Letters Patent is hereby corrected as shown below:

<u>Column 10,</u>  
Lines 53-61, delete claims 4 and 5

Signed and Sealed this

Sixth Day of April, 2004

JON W. DUDAS  
*Acting Director of the United States Patent and Trademark Office*